United States Patent Office 2,916,874
Patented Dec. 15, 1959

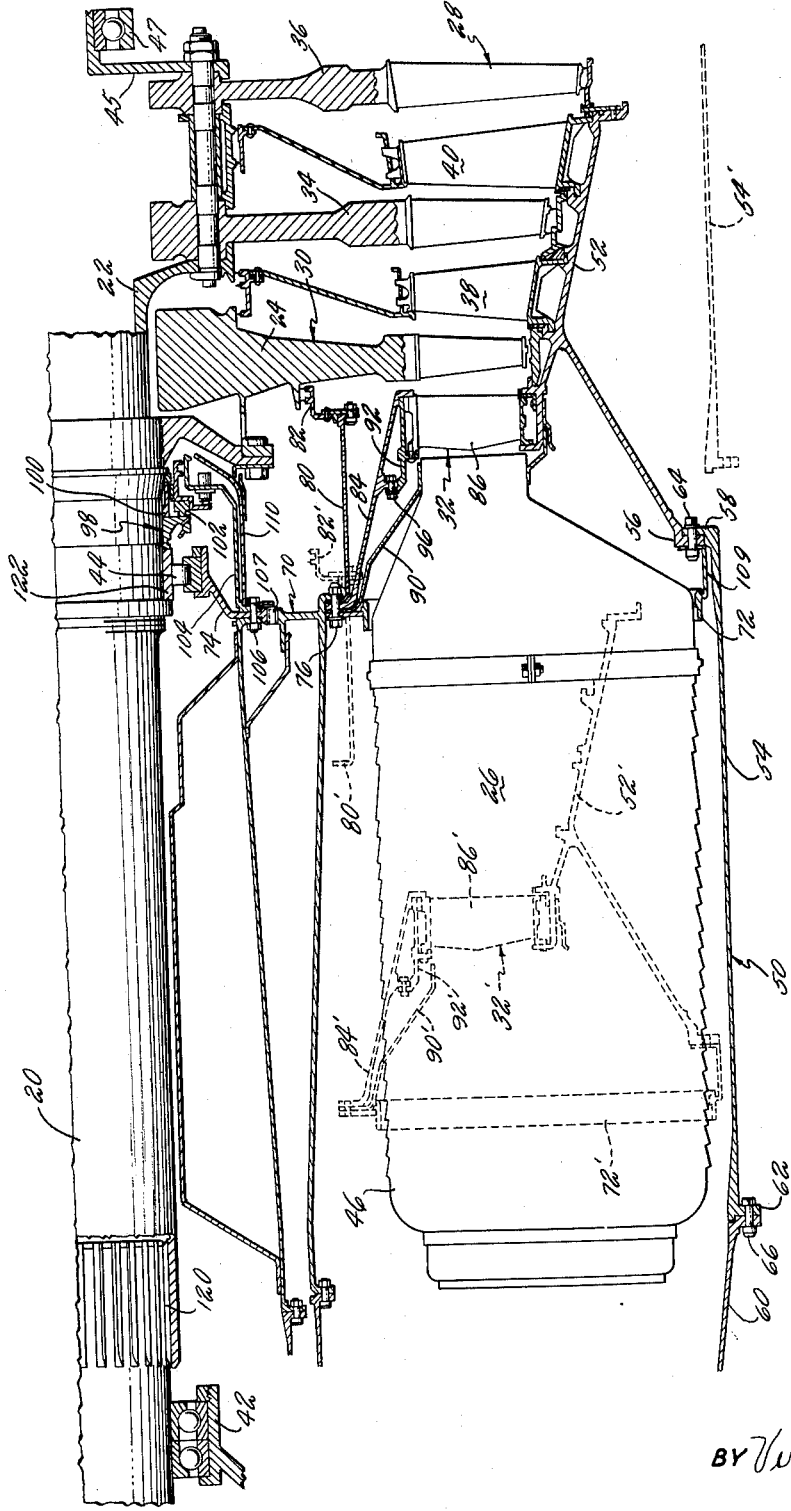

2,916,874

ENGINE CONSTRUCTION

John Worobel, Hartford, Conn., assignor to United Aircraft Corporation, East Hartford, Conn., a corporation of Delaware Application January 31, 1957, Serial No. 637,492

4 Claims. (Cl. 60—39.16)

This invention relates to powerplant or engine construction to facilitate simplified access to internal parts.

In powerplants or engines it is frequently necessary to inspect, repair or replace internal parts, especially those located in positions where severe operating conditions prevail and it is highly desirable to do same in a minimum of time and with minimum effort. In the past, when an internal part needed attention, it was necessary to disassemble the engine to reach the part. Another method of permitting access to vulnerable parts was to provide handholes in external structures and to further provide a cover for the handholes for use during engine operation. The handhole construction has the disadvantage that the leakage problems involved are great.

It is an object of this invention to provide an engine construction which permits easy access to internal parts.

It is a further object of this invention to provide engine construction which permits removal and replacement of internal engine parts with a minimum of engine assembly.

It is still a further object of this invention to provide a simple and lightweight engine construction but which has the feature of permitting easy access to internal parts and the replacement of internal parts with a minimum of engine disassembly.

Other features, advantages and objects of the present invention will become apparent to one skilled in the art by considering the attached drawing in connection with the accompanying description.

In the drawings:

The figure is a cross-sectional fragmentary showing of a modern turbojet engine in the area of the turbine and combustion chambers.

While not necessarily so limited, but for purposes of explanation, this invention will be described in connection with a typical "twin-spool" turbojet powerplant of the modern aircraft type as disclosed in U.S. Patent No. 2,770,946 which was issued on November 20, 1956 in the name of B. S. Savin, Jr.

Referring to Fig. 1 we see co-axial concentric shafts 20 and 22 which are supported by means of intershaft bearings (not shown) to be rotatable relative to one another at varying speeds and either in the same or opposite directions. The outer of the co-axial shafts 20 connects high speed turbine rotor 24 to the high speed compressor section (not shown) but which lies just forward of combustion section 26. The inner of the two co-axial shafts 22 connects the low speed turbine section 28 with the low speed compressor section (not shown) but which lies just forward of the high speed compressor section. Both the high speed and low speed turbine and compressor sections consist alternately of at least one stator and rotor. Normally both the high speed and low speed compressor sections will comprise a plurality of alternate stators and rotors while the high speed and low speed turbine sections will normally comprise fewer stators and rotors. For example, as shown in Fig. 1, the high speed turbine section 30 comprises high speed turbine rotor 24 and high speed stator 32. Fig. 1 shows the low speed turbine section 28 to comprise the second stage turbine rotor 34 and the third stage turbine rotor 36 with the second stage stator 38 and the third stage stator 40 located immediately therebefore respectively. The turbine construction is substantially the same as that shown, described and claimed in co-pending U.S. application Serial No. 618,154, now Patent No. 2,851,246, issued September 9, 1958, entitled, "Turbine or Compressor Construction and Method of Assembly" and filed on October 24, 1956 in the name of Arnold D. Nichols. Assembly and disassembly of low speed turbine rotors 34 and 36 and the accompanying turbine stators 38 and 40 would be accomplished in the fashion described in the aforementioned U.S. application Serial No. 618,154. The portion of co-axial shaft 20 shown in Fig. 1 is supported by bearing unit 42 and bearing 44. Co-axial shaft 22 is supported at its after end by a bearing 47 and is further supported, relative to shaft 20 by an intershaft bearing (not shown) and joins low speed compressor section (not shown) at the forward end, receiving support therefrom.

A plurality of combustion chambers 46 are substantially equally spaced circumferentially within combustion section 26 at substantially equal radial distances from the engine centerline which is the axis of co-axial shafts 20 and 22. Combustion chambers 46 are of the type and construction and are supported in the fashion shown, described and claimed in co-pending U.S. application Serial No. 556,733, now Patent Number 2,825,914, issued September 23, 1958, entitled, "Combustion Chamber Support Means" which was filed on December 30, 1955, in the names of Philip G. Dooley and Charles D. Robin.

By way of engine operation, air is passed thru the low speed and then the high speed compressor sections where it is compressed and is then passed thru combustion section 26 where heat is added and is then passed thru high speed turbine section 30 and low speed turbine section 28 and then discharged to atmosphere thru an exhaust nozzle (not shown).

Engine case 50 which may be of one-piece or multi-piece construction envelops the entire engine including the compressor section, the combustion section and the turbine section. As shown in Fig. 1, engine case 50 comprises one-piece turbine case 52 and one-piece burner case 54. Neither case 52 nor 54 need be of one-piece construction but it is found to be beneficial to avoid the added weight and leakage problems encountered with intermediate bolted flange connections. Turbine case 52 engages burner case 54 at flange 56. Burner case 54 engages turbine case 52 at flange 58 and further engages either compressor or diffuser case 60 at flange 62. Attachment means 64 connect turbine case 52 to burner case 54 and may be of a simple nut and bolt construction but it is important that attachment means 64 be detachable from a point external of the engine as shown in Fig. 1. Attachment means 66, which is also detachable from a point external of the engine, attaches burner case 54 to compressor or diffuser case 60. It should be noted that the shape and size of turbine case 52 and burner case 54 are so selected that they are capable of telescopic motion relative to one another and are shown, for purposes of illustration, to permit rearward movement of burner case 54 to the location shown in phantom and designated as 54'.

Diaphragm support 70 is attached to engine case 50 by means of connecting means 64 and extends substantially radially inward therefrom to position and support bearing 44 which in turn supports the outer co-axial shaft 20. Diaphragm support 70 comprises outer portion 72 and inner portion 74 which are separate units and connected by attachment means 76 which may be of the well-known nut and bolt variety as shown in Fig. 1 but which must be detachable when combustion chambers 46 are removed or from the antiturbine side of diaphragm support 70. In addition to connecting outer portions 72 and inner portion 74 of diaphragm support 70, attachment means 76 also connects and/or supports seal support ring 80 which carries air seal 82 and stator support ring 84 which supports the inner ends of vanes 86 which are part of the high speed turbine stator 32. Attachment means 76 also support burner seal ring 90. Stator support means 92 cooperates with ring 84 in supporting the inner ends of vanes 86 of stator 32 and is connected thereto by means of attachment means 96 which may be of the nut and bolt variety as shown in Fig. 1 but which should be detachable from the forward or antiturbine side of stator 32.

It will be noted that seal 98 is located on shaft 20 and between bearing 44 and the first stage turbine section 30. The rotary parts 100 of seal 98 are carried by and rotate with shaft 20 while the stationary parts 102 of seal 98 are carried by seal support 104 which is attached to diaphragm support 70 by attachment means 106. It is important that attachment means 106, which may be of any type such as the nut and bolt arrangement which is shown in Fig. 1, be detachable from the turbine side of diaphragm support 70. It will be noted that spline 107 is located in diaphragm support 70 and its function is to permit axial movement between the parts without loss of radial support from 70. Further, it will be noted that gooseneck or flexible ring 109 is a part of diaphragm support 70 and connects support 70 to engine case 50. The purpose of gooseneck 109 is to permit radial expansion between support 70 and engine case 50.

By constructing the engine as described herein and shown in Fig. 1, it is possible to remove or replace one or more of vanes 86 and seal 98 with a minimum of engine disassembly. It should be noted that both these parts are subject to severe operating conditions.

For example, if we wish to replace a vane 86, we would detach attachment means 64 and 66 and slide burner case 54 rearwardly to the position shown in phantom and designated as 54' in Fig. 1. Then, by the method taught in the aforementioned U.S. application Serial No. 556,733, now Patent Number 2,852,914, all the combustion chambers 46 may be removed.

Attachment means 76 is then detached and outer portion 72 of diaphragm support 70 with seal ring 90 is moved forward to the position shown in phantom and designated as 72' and 90' in Fig. 1. A temporary holding device such as clips (not shown) is affixed to the outer end of each vane 86. Attachment means 96 is then detached so as to permit the removal of stator support ring 92. This permits the removal of any of the vanes 86. It will be obvious that vanes 86 may be either inspected, removed or replaced with this minimum of engine disassembly. The remainder of the engine need not be disturbed.

If we wish to remove or inspect seal 98 we follow the same procedure of detaching and sliding burner case 54 rearwardly and then removing combustion chambers 46. The high speed turbine section 28 together with shaft 22 will be removed in the fashion taught in the aforementioned U.S. application Serial No. 618,154, now Patent Number 2,851,246. We now have access to attachment means 76 which will be detached to permit the outer portion 72 of diaphragm support 70 and support rings 90, 92 and 84 together with first stage stator 32 and turbine case 52 to be moved forward to the position shown in phantom in Fig. 1 in which these corresponding parts are designated by identical but primed reference numerals. It may be found desirable to bond the flanges of outer diaphragm support 72, stator support 84 and burner support 90 together to facilitate handling and assembly. Seal support ring 80 and seal 82 may then be moved forward to the position shown in phantom in Fig. 1 and identified by identical but primed reference numerals. Attachment means 106 is now accessible from the turbine side of diaphragm support 70 and may be detached, freeing seal carrier ring 104 and shield 110. Turbine section 30 and shaft 20 may then be moved rearwardly to decouple shaft 20 at coupling 120. Since the greatest diameter of the rotating parts 100 of seal 98 is forward of and greater than the minimum diameter of all stationary seal parts 102 as shaft 20 is moved rearwardly seal 98, seal carrier 104, shield 110 and the inner race 122 of bearing 44 are carried by shaft 20. The removal of the shaft 20 downstream or rearwardly of coupling 120 permits the inspection, removal or replacement of seal 98.

In assembling the engine, because there is access to carrier 104 and shield 110, they may be used in connection with attachment means 106 to guide shaft 20 into proper position and to assist in the proper alignment of the rotary parts 110 and the stationary parts 102 of seal 98. Once that shaft 20 and turbine section 30 are in assembled position, attachment means 106 may be worked from the turbine side of diaphragm support 70 to attach and position seal carrier 104 and shield ring 110. Then, turbine case 52, turbine stator 32 and support rings 90, 84 and 80 may be placed into position and attached to diaphragm support 70 by attachment means 76. Combustion chambers 46 may then be assembled in position and burner case 54 positioned and attached to turbine case 52 and compressor or diffuser case 60.

It is to be understood that the invention is not limited to the specific embodiment herein illustrated and described, but may be used in other ways without departure from its spirit as defined by the following claims.

I claim:

1. In a turbojet engine having a low speed turbine section comprising alternately at least one stator and rotor connected to a low speed compressor section and a high speed turbine section comprising alternately at least one stator and one rotor connected to a high speed compressor section, co-axial shafts connecting said turbine and compressor sections in spaced relation, axially moveable and radially removable combustion chambers located between said high speed compressor and said high speed turbine, an engine case enveloping said turbine sections, said compressor sections and said combustion chambers which engine case includes a one-piece turbine case which engages and supports the outer end of said high speed turbine stator and a one-piece burner case engaging said turbine case in telescoping fashion, a diaphragm support located just forward of said high speed turbine section and extending from said engine case to surround the outer of said co-axial shafts, which diaphragm support comprises an outer portion which is attached to said engine case by means detachable from the engine exterior and an inner portion which is attached to said outer portion by means detachable when said combustion chambers are removed from said engine and such that once detached said outer portion is movable axially forward, a bearing located radially between the outer of said co-axial shafts and said diaphragm support, a seal located between said bearing and said high speed turbine section and having rotary parts attached to and rotatable with the outer of said co-axial shafts and also having stationary parts, the improvement of stator support means engaging and supporting the inner end of said high speed turbine stator and projecting therefrom to attach to said diaphragm by means which are detachable when said combustion chambers are removed from said engine such that when detached, said stator support means, said high speed turbine stator and said turbine case are moveable forward and seal carrying means attached to said diaphragm support by means detachable from the turbine side thereof and extending therefrom to carry the stationary parts of said seal in proper sealing relation to said rotary seal parts.

2. In a turbojet engine having a low speed turbine section comprising alternately at least one stator and rotor connected to a low speed compressor section and a high speed turbine section comprising alternately at least one stator and one rotor connected to a high speed compressor section, co-axial shafts connecting said turbine and compressor sections in spaced relation, axially moveable and radially removable combustion chambers located between said high speed compressor and said high speed turbine, an engine case enveloping said turbine sections, said compressor sections and said combustion chambers which engine case includes a one-piece turbine case which engages and supports the outer end of said high speed turbine stator and a one-piece burner case engaging said turbine case in telescoping fashion, a diaphragm support located just forward of said high speed turbine section and extending from said engine case to surround the outer of said co-axial shafts, which diaphragm support comprises an outer portion which is attached to said engine case by means detachable from the engine exterior and an inner portion which is attached to said outer portion by means detachable from the anti-turbine side of said diaphragm support and such that once detached said outer portion is moveable axially forward, a bearing located radially between the outer of said co-axial shafts and said diaphragm support, a seal located between said bearing and said high speed turbine section and having rotary parts attached to and rotatable with the outer of said co-axial shafts and also having stationary parts, the improvement of stator support means engaging and supporting the inner end of said high speed turbine stator and projecting therefrom to attach to said diaphragm by means detachable from the anti-turbine side of said diaphragm support such that when detached, said stator support means, said high speed turbine stator and said turbine case are moveable forward and seal carrying means attached to said diaphragm support by means detachable from the turbine side thereof and extending therefrom to carry the stationary parts of said seal in proper sealing relation to said rotary seal parts, said rotary seal parts having portions of greater diameter loctaed forward of said stationary seal parts such that once said seal carrying means is detached from said diaphragm support said seal will move rearwardly as said high speed turbine rotor moves forward.

3. In a turbojet engine having a turbine section comprising alternately at least one stator and rotor, a shaft connected to said turbine, axially moveable and radially removable combustion chambers located adjacent said turbine, an engine case enveloping said turbine section and said combustion chambers which engine case includes a turbine case which engages and supports the outer end of the forwardmost of said turbine stators and a burner case engaging said turbine case in telescoping fashion, a diaphragm support located just forward of said turbine section and extending from said engine case to surround said turbine shaft which diaphragm support comprises an outer portion which is attached to said engine case by means detachable from the engine exterior and an inner portion which is attached to said outer portion by means detachable when said combustion chambers are removed from said engine and such that once detached said outer portion is moveable axially forward, a bearing located radially between said turbine shaft and said diaphragm support, a seal located between said bearing and said turbine section and having rotary parts attached to and rotatable with said turbine shaft and also having stationary parts, the improvement of stator support means engaging and supporting the inner end of the forwardmost of said turbine stators and projecting therefrom to attach to said diaphragm by means which are detachable when said combustion chambers are removed from said engine such that when detached said stator support means, said forwardmost turbine stator and said turbine case are moveable forward and seal carrying means attached to said diaphragm support by means detachable from the turbine side thereof and extending therefrom to carry the stationary parts of said seal in proper sealing relation to said rotary seal parts.

4. In a turbojet engine having a turbine section comprising alternately at least one stator and rotor, a compressor section, means connecting said turbine and compressor sections in axially spaced relation, axially moveable and radially removable combustion chambers located between said compressor and said turbine, an engine case enveloping said utrbine section, said compressor section and said combustion chambers which engine case includes a turbine case which engages and supports the outer end of the forwardmost of said turbine stators and a burner case engaging said turbine case in telescoping fashion, a diaphragm support located just forward of said turbine section and extending from said engine case to surround said turbine-to-compressor connecting means, which diaphragm support comprises an outer portion which is attached to said engine case by first connecting means detachable from the engine exterior and an inner portion which is attached to said outer portion by second connecting means detachable when said combustion chambers are removed from said engine and such that once detached said outer portion is moveable axially forward, a bearing located radially between said turbine-to-compressor connecting means and said diaphragm support, a seal located between said bearing and said turbine section and having rotary parts attached to and rotatable with said turbine-to-compressor connecting means and also having stationary parts, the improvement of stator support means engaging and supporting the inner end of the forwardmost of said turbine stators and projecting therefrom to attach to said diaphragm by said second connecting means which are detachable when said combustion chambers are removed from said engine such that when detached said stator support means, said forwardmost turbine stator and said turbine case are moveable forward, and seal carrying means attached to said diaphragm support by third connecting means detachable from the turbine side thereof and extending therefrom to carry the stationary parts of said seal in proper sealing relation to said rotary seal parts, air seal support means attached to said diaphragm support by said second connecting means and extending to support an air seal in proper relation to the forwardmost turbine rotor, a burner seal ring attached to said diaphragm support by said second connecting means and extending substantially to said turbine and a shield attached to said diaphragm support by said third connecting means and extending substantially to said turbine.

References Cited in the file of this patent

UNITED STATES PATENTS

| | | |
|---|---|---|
| 2,747,367 | Savin | May 29, 1956 |
| 2,756,561 | Morley | July 31, 1956 |